United States Patent [19]
Wilson et al.

[11] Patent Number: 5,329,769
[45] Date of Patent: Jul. 19, 1994

[54] MASTER CYLINDER AND BRAKE BOOSTER ARRANGEMENT FOR A BRAKE SYSTEM

[75] Inventors: Robert K. Wilson; Donald A. Crumb, both of Granger, Ind.

[73] Assignee: AlliedSignal Inc., Morristown, N.J.

[21] Appl. No.: 93,112

[22] Filed: Jul. 16, 1993

[51] Int. Cl.⁵ .............................................. B60T 13/20
[52] U.S. Cl. ......................................... 60/549; 60/562; 60/585
[58] Field of Search ................ 60/552, 553, 554, 561, 60/562, 576, 574, 585, 549

[56] References Cited

U.S. PATENT DOCUMENTS

| | | | |
|---|---|---|---|
| 3,174,285 | 3/1965 | Stelzer | 60/549 |
| 3,462,200 | 8/1969 | Lewis et al. | 60/562 |
| 4,827,720 | 5/1989 | Flynn et al. | 60/585 |
| 5,007,239 | 4/1991 | Steer | 60/585 |
| 5,044,161 | 9/1991 | Schiel et al. | 60/562 |

FOREIGN PATENT DOCUMENTS 566623  1/1953  Canada ............................ 60/585

Primary Examiner—Edward K. Look
Assistant Examiner—F. Daniel Lopez
Attorney, Agent, or Firm—Leo H. McCormick, Jr.; Larry J. Palguta

[57] ABSTRACT

A brake system (10) having a master cylinder (14) connected to wheel brakes (24, 26) of a vehicle through remote compensation valves (20, 22). The master cylinder (14) has a two piece housing (66, 84) with a bore (74, 86) therein. First (32) and second (34) pistons are located in the bore (74, 96) by a sleeve and bearing arrangement (98, 82). Return springs (104, 110) in the bore (74, 96) position the first (32) and second (34) piston to define first (106) and second (114) chambers in the master cylinder (14). The two piece housing has first (22) and second (90) flanges that are joined together by hook (94, 94', 94", 94''') and slots (73, 73', 73", 73''') to form a unitary structure and by bolts (47, 47') which further compress seals (102) by joining the first flange (72) to a brake booster (12) to assure that the bore (114) is sealed from the surrounding environment.

6 Claims, 4 Drawing Sheets

MASTER CYLINDER AND BRAKE BOOSTER ARRANGEMENT FOR A BRAKE SYSTEM

This invention relates to a brake system having a two piece master cylinder attached to a brake booster and connected to the wheel brakes of a vehicle through remote first and second compensation valves.

In designing current vehicles, the available under hood space has been shinking with a change in the position of the engines, the addition of electronic equipment and pollution control devices and with the cab on some vehicles moved forward to provide more space in the passenger compartment. Further in some vehicles, the brake booster and associated master cylinder are surrounded by the body panels or fire wall such that it is difficult to service the brake system or even check or add brake fluid to the brake system. It has been suggested that the reservoir for the master cylinder could be positioned in a location remote from the master cylinder. Such remote reservoirs were initially disclosed in U.S. Pat. No. 1,835,580 and more recently in U.S. Pat. Nos. 5,003,780 and 5,083,433. While the use of such remote reservoirs would reduce the overall configuration of a brake booster and master cylinder, the master cylinder still extends a considerable distance from the brake booster.

We have devised a brake system having a brake booster and master cylinder wherein approximately one half of the housing for the master cylinder is located within the brake booster. In this configuration, the rear piston of the master cylinder is directly connected to the movable wall of the brake booster. The brake booster which is responsive to an input force is activated to develop an output force through the movement of a movable wall by a pressure differential to provide an input force to a master cylinder. Movement of the pistons in the master cylinder pressurize fluid which is thereafter communicated through remote first and second compensation valve connected to the wheel brakes of a vehicle to effect a brake application. By positioning a portion of the master cylinder in the brake booster, there is a considerable savings in the under hood space and through the remote compensation valves, adjustment between the movable wall and piston is eliminated such that pressurizing of fluid in the master cylinder can begin immediately.

In order to locate the master cylinder in the brake booster, the master cylinder is made of a two part housing. The first housing has a first end and a second end with the second end having a first outwardly projecting annular flange and a blind axial bore that extends from the second end toward the first end. The blind bore has a first outlet port adjacent the first end and a second outlet port adjacent the second end with an annular shoulder in the housing between the first and second outlet ports. The second housing has a first end and a second end with the first end having a second outwardly projecting flange and the second end having an inwardly projecting flange. The second housing has an axial bore that extends from the second outwardly projecting flange to the inwardly projecting flange. A first seal and bearing arrangement which is positioned in the blind bore by the annular shoulder of the first housing engages the first piston. A second seal and bearing arrangement which is positioned in the axial bore adjacent the inwardly projecting flange on the second housing engages the second piston. A sleeve member is located in the bore to maintain the first and second seal and bearing arrangements in a substantially stationary position within the housing. Tabs on the second outwardly projecting flange extend through slots on the first outwardly projecting flange to define a unitary structure. A first spring located in the blind bore engages the first piston to define a first chamber within said unitary structure while a second spring located in the axial bore engages the first and second pistons to define a second chamber within the unitary structure. Nuts are attached to bolts which extend from the brake booster to join the first housing to the brake booster while at the same time bringing the end of the second piston into engagement with the movable wall in the brake booster. As the nuts are tightened on the bolts, seal means located between the first and second outwardly extending flanges are compressed to assure that the blind and axial bores are sealed from the environment such that movement of the first and second pistons immediately pressurizes fluid to effect a brake application.

An advantage of this master cylinder with remote compensation occurs by locating approximately one half of a two piece housing in a brake booster with a pressurizing piston in the master cylinder directly connected to a movable wall in the brake booster to eliminate the need for adjustment between the movable wall and pistons in the master cylinder while producing a compact unitary structure.

An object of this invention is to provide a master cylinder brake booster arrangement wherein approximate one half of the master cylinder housing is located in the brake booster.

A further object of this invention is to provide a master cylinder with a two piece housing wherein a seal between the first and second housings initially seals operational chambers from the environment and bolts through which the master cylinder is attached to a brake booster further compresses the seal aid in the sealing of the operational chambers.

These objects and advantages should be apparent from reading this specification while viewing the drawings wherein.

Figure 1:
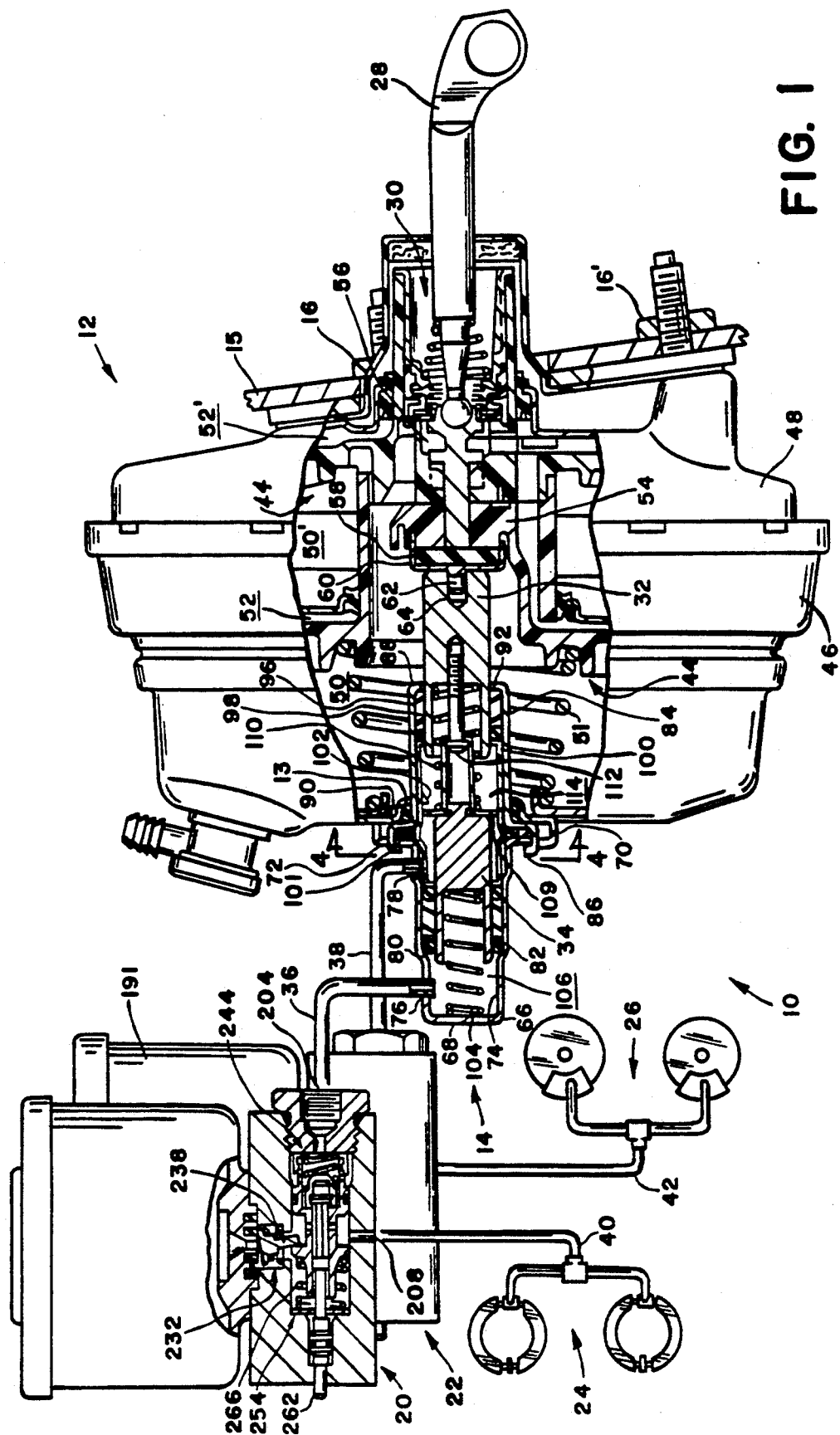
FIG. 1 is an illustration of a brake system having a two piece master cylinder and brake booster arrangement connected to remote compensation valves through which pressurized fluid is supplied to the wheel brakes of a vehicle, the two piece master cylinder being made in accordance with the principles of the present invention.

The brake system 10 as shown in FIG. 1 includes a brake booster 12 which is attached to the firewall 15 of a vehicle by bolts 16, 16', a master cylinder 14 attached to the brake booster 12 and first 20 and second 22 remote compensation valves attached to rear wheel brakes 24 and front wheel brakes 26 of the vehicle. In response to an input force applied to push rod 28, control valve 30 in brake booster 12, which functionally is of a type as disclosed in U.S. Pat. No. 5,233,911, is activated to develop an operational pressure differential to produce an output force. The output force is applied as input force to immediately move the operational pistons 32 and 34 in the master cylinder 14 to pressurize fluid which is communicated by lines 36 and 38 to first 20 and second 22 remote compensation valves, respectively, for presentation by line 40 to the rear wheel brakes 24 and by line 42 to front wheel brakes 26 to effect a brake application.

In more particular detail, the brake booster 12 in addition to the control valve 30 has a movable walls 44, 44' which separates the interior of front and rear shells 46 and 48 into a front chambers 50, 50' and a rear chambers 52, 52'. The movable walls 44, 44' have a central hub 54 with a bore 56 therein for retention of control valve 30 and passageways to provide for communication between the front chambers 50, 50', rear chambers 52, 52' and the environment. A reaction disc 58 retained in cup member 60 is positioned on the central hub 54 to receive to output force developed through movement of walls 44, 44'. Cup member 60 has a projection or guide pin 62 which is aligned in bore 64 within piston 32 of the master cylinder 14.

Figure 4:
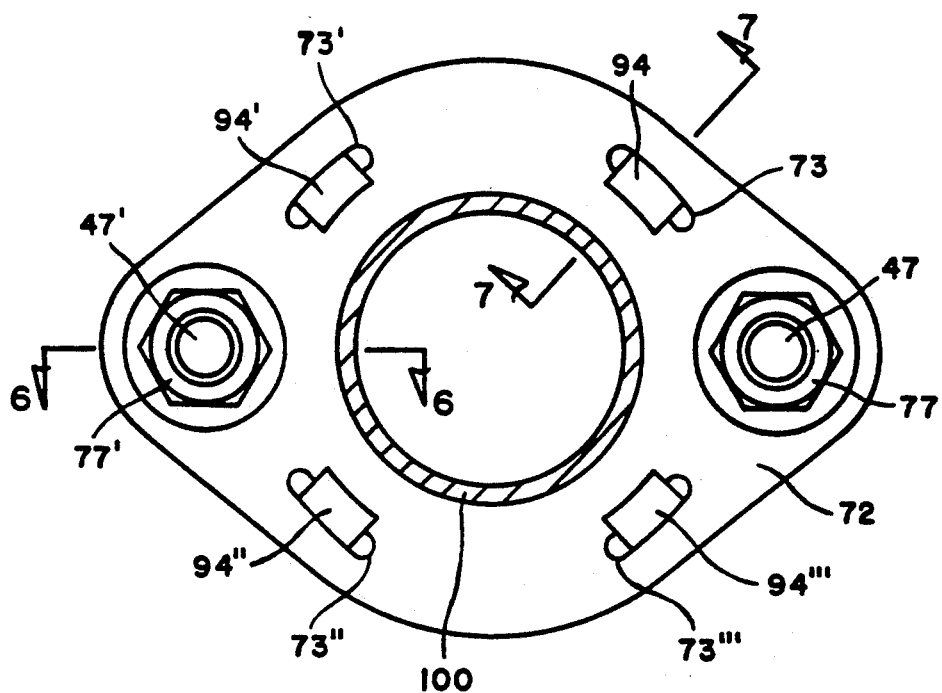
FIG. 4 is an enlarged sectional view taken along line 4—4 of FIG. 1 showing the flange connection for the two piece master cylinder.
Figure 6:
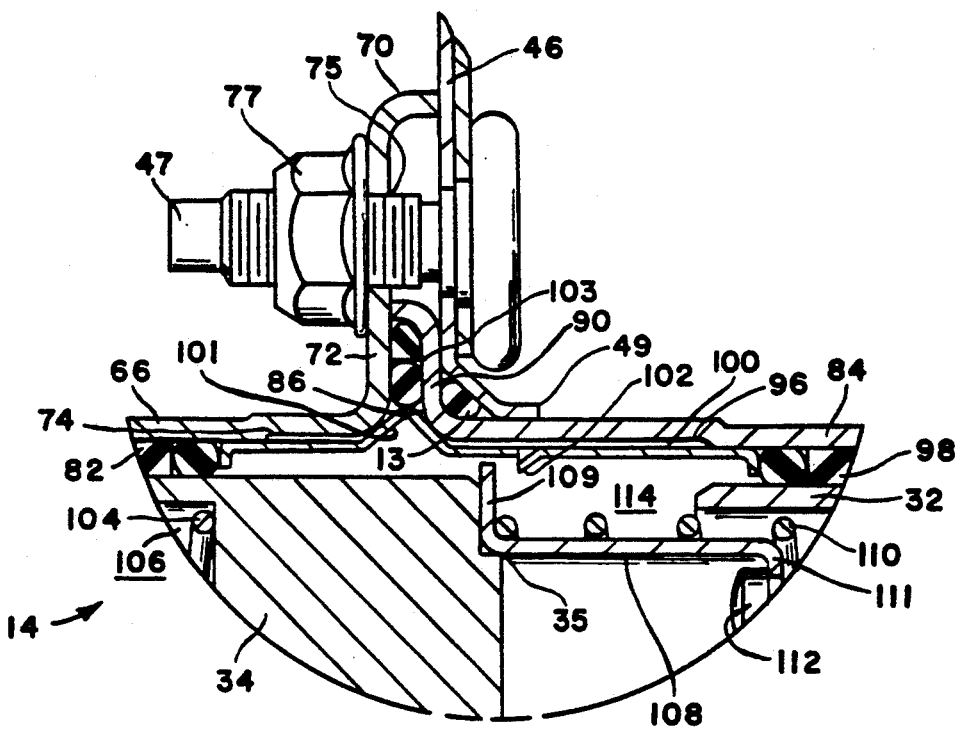
FIG. 6 is an enlarged section view taken along line 6—6 of FIG. 4.
Figure 7:
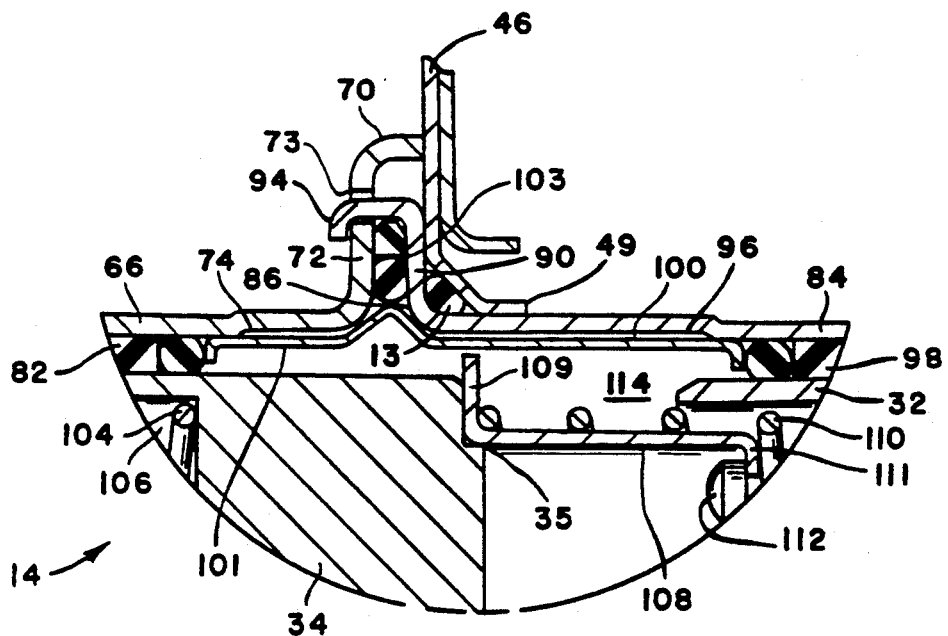
FIG. 7 is an enlarged sectional view taken along line 7—7 of FIG. 4.

The two piece master cylinder 14 has a first cylindrical housing 66 and a second cylindrical housing 84. The first cylindrical housing 66 has a first end 68 and a second end 70. The second end 70 has a first outwardly projecting annular flange 72 with a plurality of slots 73, 73', 73" and 73'" located thereon and openings 75, 75' for attachment to bolts 47, 47' extending from shell 46 of the brake booster 12, see FIG. 4, 6 and 7. The housing 66 has a blind axial bore 74 that substantially extends from the second end 70 to the first end 68. The blind bore 74 has a first outlet port 76 adjacent the first end 68 and a second outlet port 78 adjacent the second end 70. An annular shoulder 80 is located between the first 76 and second 78 outlet ports to define a stop for a first seal and bearing arrangement 82 located in bore 74.

The second cylindrical housing 84 has a first end 86 and a second end 88. The first end 86 has a second outwardly projecting flange 90 and the second end 88 has an inwardly projecting flange 92. The outwardly projecting flange 90 has a plurality of tabs 94, 94', 94" and 94'" that extend through slots 73, 73', 73" and 73'" and are crimped on flange 72 to form a unitary structure, see FIGS. 4, 6 and 7. The second housing 84 has an axial bore 96 that extends from the second outwardly projecting flange 90 to the inwardly projecting flange 92. A second seal and bearing arrangement 98 which is located in axial bore 96 adjacent the inwardly projecting flange 92 engages piston 32. A sleeve 100 located in blind bore 74 and axial bore 96 holds the first 82 and second 98 seal and bearing arrangements in a substantially stationary position. Sleeve 100 has an annular projection 101 for positioning a seal and backup ring 103 between flanges 72 and 90 to initially seal bores 74 and 96 from the surrounding environment when the second housing 84 is joined to the first housing 66 to form a unitary structure.

A first spring 104 is located in the blind bore 74 and with the first piston 34 defines the limits for a first chamber 106 within the unitary structure while a caging arrangement located in axial bore 96 acts on pistons 32 and 34 to the limits for a second chamber 114. The caging arrangement includes a retainer 108 with a first flange 109 which is located on ledge 35 on piston 34, return spring 110 and a bolt 112 which engages a second flange 111 of retainer 108 to attached retainer 108 to piston 32. The length of bolt 112 of the caging arrangement sets the limits the extension of return spring 110 and thereby defines a maximum displacement volume for chamber 114. In order to prevent the pistons 32 and 34 from being pushed out of the unitary structure by return spring 104 after the master cylinder 14 is assembled and before being attached to shell 46, sleeve 100 has plurality of inwardly projections 102, only one of which is shown, that engage retainer flange 109. Further, that portion of the second piston 32 which extends past inwardly projecting flange 92 in the second housing 84 has a bore 64 therein for receiving projection 62 on cup 60 connected to movable wall 44 to assure that piston 32 is aligned within bore 96.

The master cylinder 14 is attached to shell 46 by first locating the second housing 84 in opening 49 in shell 46 and aligning openings 47, 47' on bolts 75, 75' with the first 76 and second 78 outlet ports in a top position as shown in FIG. 1. As later discussed herein, with the outlet ports in this location, bleeding of air from the system may be better achieved. Nuts 77,77' are placed on bolts 75, 75' and tightened to bring the first outwardly projecting flange 72 toward shell 46 of brake booster 12 while at the same time the second flange 90 engages seal 13 in opening 49 to seal chamber 50 from the surrounding environment. As nuts 77,77' are tightened, seal and back up member 103 are further compressed between flanges 72 and 90 to seal chamber 114 from the surrounding environment. Once master cylinder 14 is attached to shell 46, the end of piston 32 engages cup 60 on movable wall 44 such that any output force produced by the movable wall is immediately transferred into pistons 32 and 34 for pressurizing fluid in chambers 106 and 114 to develop pressurized fluid which is supplied to the remote first and second compensation valves 20 and 22.

Figure 2:
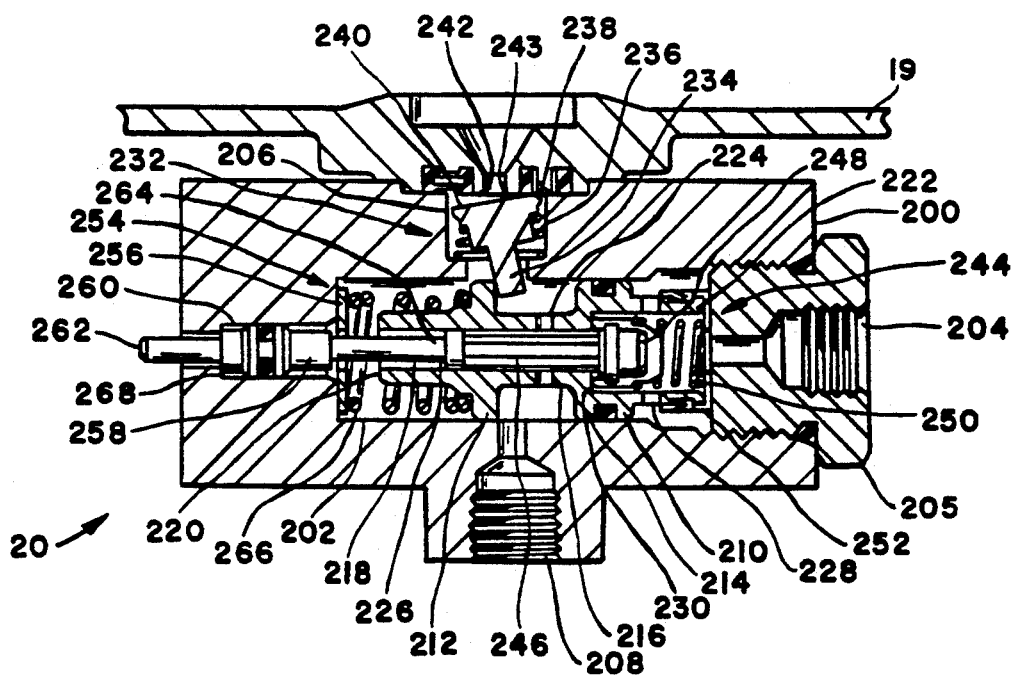
FIG. 2 is an enlarged sectional view of a remote compensation valve of FIG. 1 in the rest position and in the absence of pressurized fluid being presented from the master cylinder.
Figure 3:
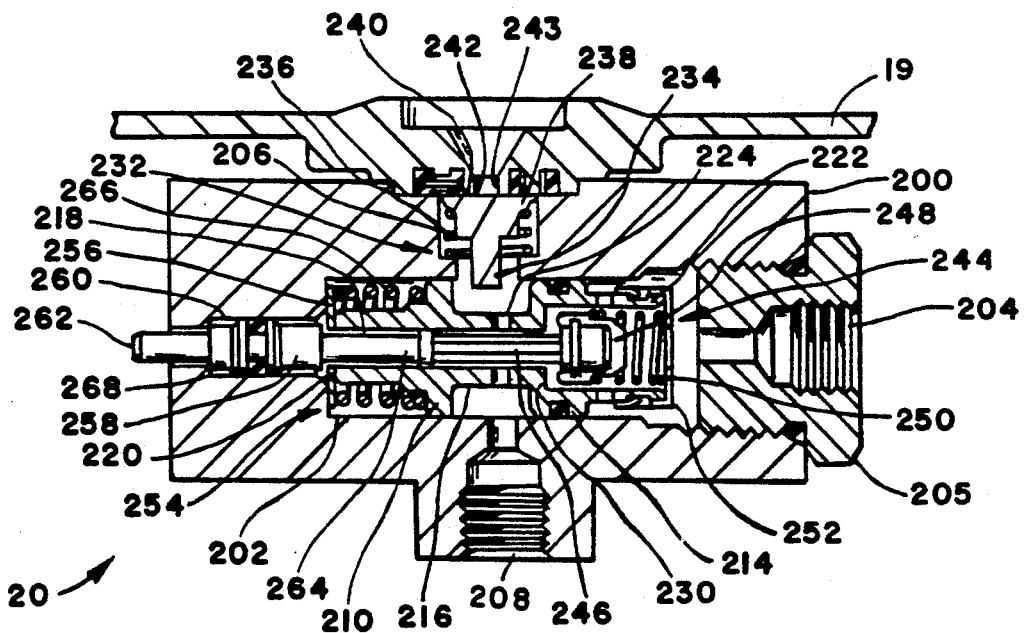
FIG. 3 is an enlarged sectional view of the remote compensation valve of FIG. 2 in a fully operational position in response to receiving pressurizing fluid from the master cylinder.
Figure 5:
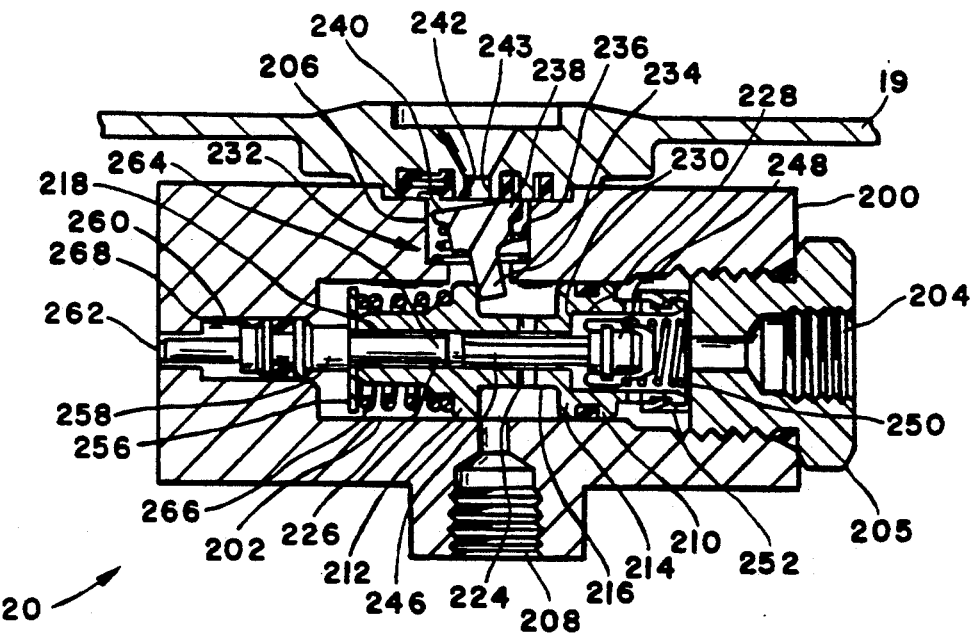
FIG. 5 is an enlarged sectional view of a remote compensation valve of FIG. 1 wherein a popper valve therein is manually moved to a position to allow communication between a source of fluid in a reservoir and a fluid pressurizing chamber in the master cylinder.

The remote compensation valves 20 and 22 through which pressurized fluid is supplied to the rear 24 and front 26 wheel brakes to effect a brake application for the vehicle are structurally and functionally the same and only valve 20 shown in FIG. 2, 3 and 5 is hereinafter described in detail.

Valve 20 has a housing 200 with a bore 202 therein. Bore 202 is connected to line 36 by an inlet port 204 in end cap 205, to reservoir 19 to a compensation port 206 and by line 40 by an outlet port 208. A shuttle piston 210 located in bore 202 has a first land 212 separated from a second land 214 by a groove 216. Land 214 and retained 0-ring seal separates the inlet port 204 from the compensation port 206 and outlet port 208. Piston 210 has an axial bore 218 therein that extends from a first end 220 to a second end 222 and at least one radial bore 224 that extends from the axial bore 218 to a groove 216 to connect the inlet port 204 with the outlet port 208. The axial bore 218 in piston 210 has a first diameter 226 separated from a second diameter 228 by a shoulder 230.

A tilt valve 232 located in compensation port 206 of housing 200 has a pin 234 that extends into groove 216 in piston 210. A spring 236 acts on head 238 of the tilt valve to toward urge face 240 to a seat 242 surrounding opening 243 in the reservoir 19 to control communication into bore 202 of housing 200.

A popper valve 244, of a type disclosed in U.S. Pat. No. 5,214,917 has a stem 246 located in the first diameter 226 of bore 218 and a head 248 attached to stem 246 that is located in the second diameter 228. A cap 252 attached to piston 210 retains a spring 250 which urges head 248 on popper valve 244 toward shoulder 230 to control the flow of fluid through axial bore 218 in piston 210. Spring means 254 located in bore 202 urges piston 210 toward inlet port 204 to bring the first land 212 into engagement with pin 234 on tilt valve 232 and initiate communication of fluid between opening 243 for a source of fluid in reservoir 19 and bore 202 through compensation port 206, as shown in FIG. 2. Spring means 254 has a disc 256 carried on movable stop pin 258 retained in bore 260 of housing 200. Movable stop pin 258 has a first end 262 which is external to housing 200 and a second end 264 that extending into axial bore 218 of piston 210. The coils 266 of spring means 254 which are located between disc 256 and land 212 act on annular flange 268 on movable stop pin 258 into engagement with housing 200 and land 212 into engagement with pin 234 to define a rest position as shown in FIG. 2. In this position, free communication of fluid occurs between reservoir 19, bore 202 and outlet ports 208, 208' connected to the by line 40 to the rear wheel brakes 24 and by line 42 to the front wheel brakes 26. However, it should also be understood in this rest position that head 248 on popper valve 244 is seated on face 230 and as a result, chambers 106 and 114 in master cylinder 14 are isolated from the source of fluid in reservoir 19,19'.

During a brake application, an input force applied to push rod 28 activates control valve 30 to develop a pressure differential between chambers 50, 50' and 52, 52' and create an output force. The output force after overcoming return spring 51 moves movable walls 44, 44' to provide an input force which is directly communicated through reaction disc 58 and cup member 60 to the end of piston 32 of the master cylinder 14. Movement of piston 32 is carried through caged spring 110 to piston 34 and as a result simultaneous pressurization of fluid occurs in chambers 106 and 114. The pressurized fluid is communicated to remote compensation valves 20 and 22 for distribution to the rear 24 and front 26 wheel brakes of the vehicle. The size and strength of the coils 266 of spring means 254 in remote compensation valves 20 and 22 can be the same or different depending on the need or desire to delay the actuation of the front wheel brakes 26 until after the rear wheel brakes 24. The pressurizing fluid is communicated to the inlet port 204, by way of example, to remote compensation valve 20. The pressurized fluid acts on shuttle piston 210 and overcomes spring means 254 to initially move land 212 away from pin 234 and thereafter allows spring 236 to urge face 240 against seat 242 to terminate fluid communication from reservoir 19 through compensation port 206 to bore 202. After shuttle valve 210 has moved through a predetermined stroke or distance, the end of stem 246 on poppet valve 244 engages the end 264 on movable stop pin 258. As best shown in FIG. 3, once fluid communication with the reservoir 19 terminates, the popper valve 244 remains stationary with further movement of shuttle piston 210 such that face 230 moves away from head 248 to initiate communication of pressurized fluid from the inlet port 204 to the outlet port 208 by way of axial bore 226 and radial bore 224 to effect a brake application. When a brake application is completed and in the absence of pressurized fluid being presented to inlet port 204, spring means 254 moves shuttle piston 210 to initially bring seat 230 into engagement with head 248 and to interrupt communication of fluid through bore 218. Thereafter land 212 engages pin 234 of tilt valve 232 to reestablish communication of fluid through opening 243 from the source of fluid in reservoir 19 through compensation port 206 to bore 202 as illustrated in FIG. 2. At the same time, return spring 51 repositions wall 44 of brake booster 12 in its rest position as shown in FIG. 1.

During manufacture of a vehicle lines 36 and 38 are connected to the master cylinder 14. Once all of the connections are made in the brake system, brake fluid is added and the system is vacuum bleed. To assure that air is removed from chambers 106 and 114, a manual input is applied to end 262 of movable stop 258 to compress coils 266 in spring means 254 and bring end 264 into engagement with stem 246 to move head 248 away from seat 230 and establish communication between reservoir 19 to outlet port 204, as shown in FIG. 5. Fluid from reservoir 19 is communicated to chambers 106 and 114 as air is evacuated from the system. Removal of air from the system assures that an input force applied to pistons 32 and 34 pressurizes fluid rather than compressing air during a brake application.

We claim:

1. A brake system having a brake booster responsive to input force for developing an output force through a movable wall to provide an input force to a master cylinder for supplying a remote compensation valve connected to the wheel brakes of a vehicle with pressurized fluid to effect a brake application, said master cylinder comprising:

a first housing having a first end and a second end, said second end having a first outwardly projecting annular flange, said first housing having a blind axial bore therein that substantially extends from said second end toward said first end, said blind bore having a first outlet port adjacent said first end and a second outlet port adjacent said second end, said first housing having an annular shoulder located between said first and second outlet ports;

a second housing having a first end and a second end, said first end having a second outwardly projecting flange, said second end having an inwardly projecting flange; said second housing having an axial bore that extends from said second outwardly projecting flange to said inwardly projecting flange, a first seal and bearing arrangement located in said blind bore adjacent said annular shoulder of said first housing;

a second seal and bearing arrangement located in axial bore adjacent said inwardly projecting flange on said second housing;

a sleeve located in said blind bore and axial bore having a first end for engaging said first seal and bearing arrangement and a second end for engaging said second seal and bearing arrangement to maintain said first and second seal and bearing arrangements in a substantially stationary position, said sleeve having a plurality of inwardly projecting tangs;

means for joining said first outwardly projecting flange with said second outwardly projecting flange to define a unitary structure;

a first piston located in said blind bore and engaging said first seal and bearing arrangement;

a second piston a first portion of which is located in said axial bore and engaging said second seal and bearing arrangement and a second portion which extends past said inwardly projecting flange in said second housing;

a first spring located in a first chamber defined by said blind bore and first piston;

a second spring located in a second chamber defined by said axial bore and said first and second pistons;

caging means connected to said second piston for limiting the extension of said second spring to define a maximum size for said second chamber, said caging means engaging said tangs on said sleeve to provide a stop to maintain said second piston within said second housing; and means for joining said first outwardly projecting flange with said brake booster to position the end of said second portion of said second piston into engagement with said movable wall of said brake booster, said output force of said movable wall immediately moving said first and second pistons in said first and second chambers to develop said pressurized fluid to effect said brake application.

2. The brake system as recited in claim 1 wherein said second piston includes an axial bore for receiving a guide pin on said movable wall to aid in maintaining said second piston in substantially axial alignment within said second chamber.

3. The brake system as recited in claim 2 wherein said means for joining said first outwardly projecting flange with said brake booster positions said first and second outlet ports in a vertical position such that the inclusion of air in the first and second chambers is attenuated.

4. The brake system as recited in claim 3 further including:

an annular ring located between said first and second flanges which is initially compressed by said means that joins said first flange to the second flange to form said unitary structure and later further compressed by said means for joining said first flange to said booster to assure that fluid is retained in said second chamber.

5. The brake system as recited in claim 4 wherein said means for joining said first flange to said booster positions said second housing substantially in said booster.

6. The brake system as recited in claim 5 further including remote compensation valves connected to said outlet ports for providing fluid to said housing first and second chamber to maintain the ability to pressurize the fluid on movement of the pistons.

* * * * *